United States Patent [19]
Tabuchi et al.

[11] Patent Number: 6,004,414
[45] Date of Patent: Dec. 21, 1999

[54] TIRE MANUFACTURING METHOD AND MACHINE

[75] Inventors: Kenjiro Tabuchi; Satoru Honma; Hiroki Touya, all of Kodaira, Japan

[73] Assignee: Bridgestone Corporation, Tokyo, Japan

[21] Appl. No.: 09/005,042

[22] Filed: Jan. 9, 1998

[30] Foreign Application Priority Data

Jan. 17, 1997 [JP] Japan .................................. 9-005975
Nov. 26, 1997 [JP] Japan .................................. 9-324492

[51] Int. Cl.$^6$ .................................................. B29D 30/32
[52] U.S. Cl. ........................ 156/132; 156/131; 156/133; 156/401; 156/403
[58] Field of Search ............................. 156/64, 131, 132, 156/401, 403, 133, 135

[56] References Cited

U.S. PATENT DOCUMENTS

| | | | |
|---|---|---|---|
| 3,690,989 | 9/1972 | McCafferty et al. | 156/403 |
| 3,728,194 | 4/1973 | Enders | 156/403 |
| 3,944,456 | 3/1976 | Cantarutti | 156/132 |
| 4,048,002 | 9/1977 | Mallory | 156/403 |
| 5,073,225 | 12/1991 | Schmitt et al. | 156/401 |

*Primary Examiner*—Geoffrey L. Knable
*Attorney, Agent, or Firm*—Sughrue, Mion, Zinn, Macpeak & Seas, PLLC

[57] ABSTRACT

A tire manufacturing method enabling a tire to maintain a high quality and a tire manufacturing machine of a simple construction and low cost by which improvement of productivity, saving of energy and reduction of maintenance man-hour are possible is provided. A tire green-case is manufactured on a drum by the steps of winding a ply round the drum; expanding the drum to enlarge its diameter; positioning annular beads held by an inner base holder and an outer bead holder at respective predetermined positions on both sides of the drum; advancing each of the inner and outer bead holders toward the drum with thrust controlled by a control means to drive the beads; retreating the inner and outer bead holders; expanding bladders positioned on both sides of the ply; advancing again each of the inner and outer bead holders toward the drum with thrust controlled by the control means to press the expanded bladder laterally, thereby both sides of the ply being folded back so as to wrap the beads; and pressing the both sides of the ply folded back against a main part of the ply.

9 Claims, 6 Drawing Sheets

TIRE MANUFACTURING METHOD AND MACHINE

BACKGROUND OF THE INVENTION

The present invention relates to a tire manufacturing method and a machine, and particularly to method and a machine for forming a green-case by a first forming machine.

In the first forming machine, beads are driven on portions near both ends of a ply applied on a drum and the both ends are folded back about the beads by means of bladders to form a green-case. The bead setter is required to be driven with a thrust higher than 4 tons to drive the beads and fold back the ply, and therefore in conventional bead setters, hydraulic cylinders have been used.

For example, a hydraulic pump is operated by a large capacity electric motor of 15 Kw or more and the hydraulic cylinder is driven by oil pressure caused by the hydraulic pump to move a bead holder.

The oil pressure of the hydraulic cylinder can be changed barely in two steps of high and low, and it is impossible to set thrust and moving speed separately. Therefore moving speed is sacrificed to obtain a necessary thrust and the production efficiency is low. Since thrust can not be adjusted step by step, it is impossible to correspond with various tire sizes.

In the case where the hydraulic cylinder is operated with high oil pressure, the thrust is too large for some tire sizes and the beads are apt to slip off when the beads are driven or the ply is folded back, therefore there is a problem that quality of the tire deteriorates owing to the slipping off of the beads.

On the other hand, in the case that the hydraulic cylinder is operated with low oil pressure, there is a fear that the thrust for driving the beads or folding back the ply is insufficient and it is impossible to cope with various tire sizes.

Since the hydraulic pump is driven by the electric motor of large capacity, electric power consumption is large. It is necessary to inspect the hydraulic pump periodically to confirm the oil amount, therefore many man-hours are required for maintenance and the work is troublesome. The mechanism becomes complicated because a hydraulic circuit must be constituted, and sometimes an additional cooling fan is required to avoid increase of oil temperature resulting in high cost.

SUMMARY OF THE INVENTION

The present invention has been accomplished in view of the foregoing and one object of the invention is to provide a tire manufacturing method enabling a tire to maintain high quality. Another object of the invention is to provide a tire manufacturing machine of a simple construction and low cost to improving productivity, saving energy and reducing maintenance man-hours.

In order to attain the above one object, the present invention provides a tire manufacturing method for manufacturing on a drum a tire green-case, comprising the steps of: winding a ply round the drum; expanding the drum to enlarge its diameter; positioning annular beads held by an inner bead holder and an outer bead holder at respective predetermined positions on both sides of the drum; advancing each of the inner and outer bead holders toward the drum with thrust controlled by a control means to drive the beads; retreating the inner and outer bead holders; expanding bladders positioned on both sides of the ply; advancing again each of the inner and outer bead holders toward the drum with thrust controlled by the control means to press the expanded bladder laterally, thereby both sides of the ply being folded back so as to wrap the beads; and pressing the both sides of the ply folded back against a main part of the ply.

Since the thrust of the bead holder is controlled by the control means when the bead holder drives the bead, the bead does not slip off at that time. Further, since the control means carries out folding back of the ply controlling the thrust of the bead holder, there is no fear that the driven bead slips off when the ply is folded back. As the result, quality of the produced tire as well as the green-case is improved.

In order to attain the above another object, the present invention provides a tire manufacturing machine for forming a green-case by driving beads on portions near both ends of a ply applied on a drum and folding back both ends about the beads by means of bladders, comprising bead holders movable in the axial direction provided on both sides of the drum for holding the beads to drive them on the portions near both ends of the ply and pressing down the expanded bladders to assist in folding back the both ends of the ply, an electric motor as a power source, control means for controlling the drive of the electric motor, and a driving mechanism through which the electric motor moves the bead holder.

Since the electric motor controlled by the control means drives the bead holder through the driving mechanism, thrust control and moving speed control can be carried out separately. Therefore a pertinent thrust in accordance with a tire size can be obtained when the bead is driven or the ply is folded back to prevent slip off of the bead, and it is possible to shorten working hours and improve production efficiency by increasing the moving speed when the bead holder is merely moved.

Since the mechanism is driven by the electric motor, the construction is simple, maintenance man-hours, i.e., is few, operation is easy and cost can be reduced.

According to an aspect of the present invention, in the above tire manufacturing machine, position detection means for detecting a position of the bead holder is provided, and the control means controls speed and torque of the electric motor on the basis of the position of the bead holder detected by the position detection means.

When the bead holder is in a position for driving the bead or in a position for folding back the ply, the driving and folding back can be carried out with a pertinent thrust by the torque control, and when the bead holder is in a position for moving, the bead holder is moved at a high speed by the moving speed control to shorten working hour and raise production efficiency.

The above-mentioned electric motor may be a servomotor or an induction motor subjected to vector control. Step by step thrust adjustments or fine controls can be carried out in accordance with tire sizes.

The above-mentioned driving mechanism may be a ball screw mechanism connected to the electric motor or an electric cylinder with the electric motor built in. Owing to the ball screw mechanism or a variable speed mechanism of the motor for the electric cylinder, capacity of the motor can be reduced, electric power consumption is small and energy consumption can be suppressed.

DETAILED DESCRIPTION OF THE PREFERRED EMBODIMENT

Hereinafter, a preferred embodiment of the present invention will be described with reference to FIGS. 1 to 9.

Figure 1:
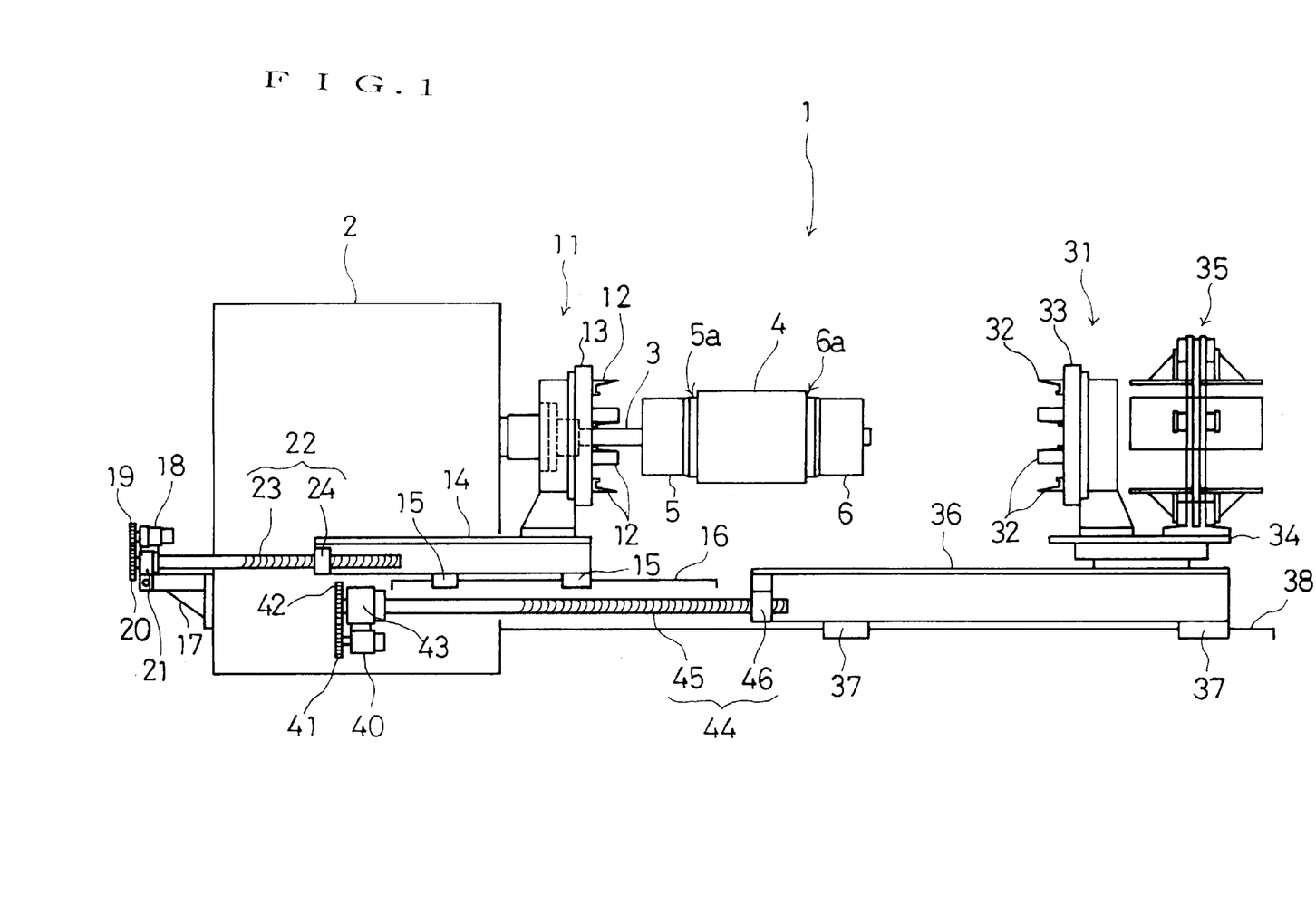
FIG. 1 is a partly omitted side view of a tire forming machine according to a preferred embodiment of the present invention.

FIG. 1 is a partly omitted side view of a tire forming machine for the first formation. A driving apparatus 2 is erected on the left side, a rotary shaft 3 is projected to the right horizontally from the driving apparatus 1 and a drum 4 is supported at an end of the rotary shaft 3.

The diameter of the drum 4 can be increased and decreased. On the both sides of the drum 4, bladders 5, 6 are extended in shape of cylindrical bags. When the diameter of the drum 4 is increased, it is larger than the outer diameters of the bladders 5, 6 so that annular steps 5a, 6a are formed between the drum 4 and the bladders 5, 6.

Between the drum 4 and the driving apparatus 2 is disposed an inner bead setter 11 movably right and left. The inner bead setter 11 is erected on a slide carriage 14 and has an annular supporting member 13 for supporting a bead holder 12. The rotary shaft 3 passes through the interior of the annular supporting member 13 along the center line thereof. The slide carriage 14 is supported on a rail 16 laid in right and left direction through sliders 15.

On the side of the driving apparatus 2, a servomotor 18 and a bearing member 21 are supported by a bracket 17, and a ball screw 23 ia supported rotationally by the bearing member 21. A gear 20 fitted to the left end of the ball screw 23 is engaged with a gear 19 fitted to a drive shaft of the servomotor 18. The ball screw 23 extends toward the right and passes through and engages with a nut 24 fixed to the left end part of the slide carriage 14 to form a ball screw mechanism 22.

Therefore, when the ball screw 23 is driven through the gears 19, 20 by the servomotor 18 to rotate, the nut 24 engaged with the ball screw 23 moves right and left together with the slide carriage 14. Namely, the bead holder 12 supported by the annular supporting member 13 of the inner bead setter 11 erected on the slide carriage 14 is moved right and left by the servomotor 18 through the ball screw mechanism 22 to approach and leave the drum.

Figure 2:
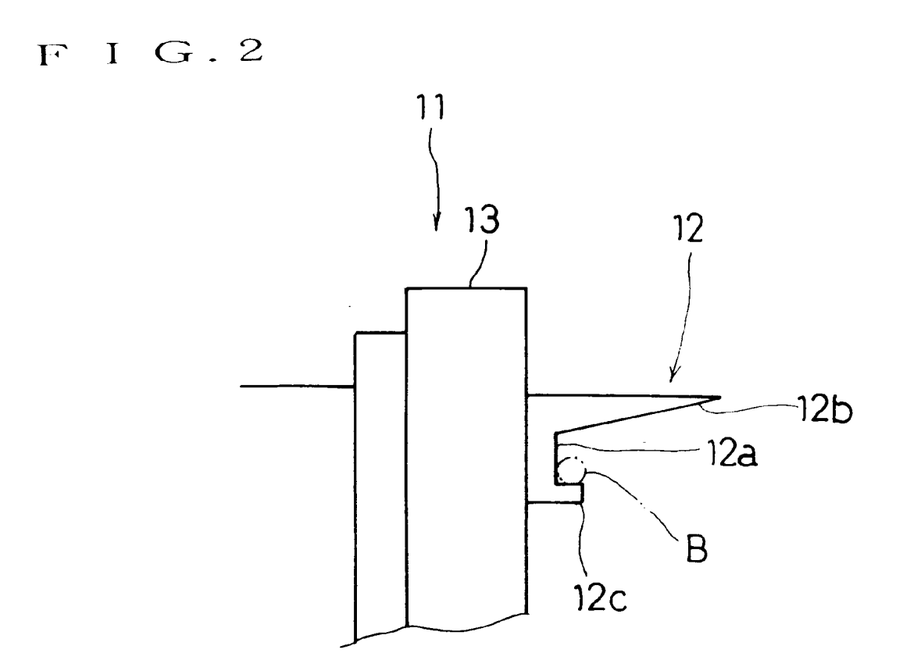
FIG. 2 is an enlarged side view of a bead holder.

A plurality of the bead holders 12 are arranged circumferentially on the right side surface of the annular supporting member 13. The bead holders 12 are always on a concentric circle and capable of moving radially all at once to enlarge or reduce the diameter of the concentric circle. As shown in FIG. 2, each bead holder 12 has a side wall 12a, an inclined wall 12b extending obliquely to the right from an outer edge of the side wall 12a and a projection 12c somewhat projected to the right from an inner edge of the side wall 12a.

The bead holders 12 support an annular bead B which is positioned between the inclined walls 12b and the projections 12c along the side walls 12a of the bead holders 12 to be enlarged diametrically by the projections 12c (FIG. 2).

On the right of the drum 4, an outer bead setter 31 is disposed movably right and left in the same manner as the inner bead setter 11. The outer bead setter 31 has a construction symmetrical with the inner bead setter 11 and a plurality of bead holders 32 are supported movably in radial directions on an annular supporting member 33 erected on a rotary pedestal 34.

On the rotary pedestal 34, besides the annular supporting member 33, a case holding apparatus 35 for supporting a green-case is mounted. The rotary pedestal 34 is supported on a slide carriage 36 rotationally about a vertical axis so that positions of the outer bead setter 31 and the case holding apparatus 35 can be alternated with each other by rotating the rotary pedestal 34 by 180 degrees.

The slide carriage 36 is movably supported through sliders 37 on a rail 38 laid in the right and left direction.

On the side of the driving apparatus 2 are supported a servomotor 40 and a bearing member 43 supporting a ball screw 43 rotationally, and a gear 42 fitted to a left end of the ball screw 45 is engaged with a gear 41 fitted to a driving shaft of the servomotor 40. The ball screw 45 extends to the right and passes through and engages a nut fixed to a left end part of the slide carriage 36 to form a ball screw mechanism 44.

Therefore, when the ball screw 45 is driven by the servomotor 40 through the gears 41, 42 to rotate, the nut engaged with the ball screw 45 moves right and left together with the slide carriage 36. Namely, the bead holder 32 supported by the annular supporting member 33 of the outer bead setter 31 erected on the rotary pedestal 34 on the slide carriage 36 is moved right and left by the servomotor 40 through the ball screw mechanism 44 to approach and leave the drum 4.

Thus, the inner bead setter 11 and the outer bead setter 31 can be moved right and left by the servomotors 18, 40 through the ball screw mechanisms 22, 44.

Figure 3:
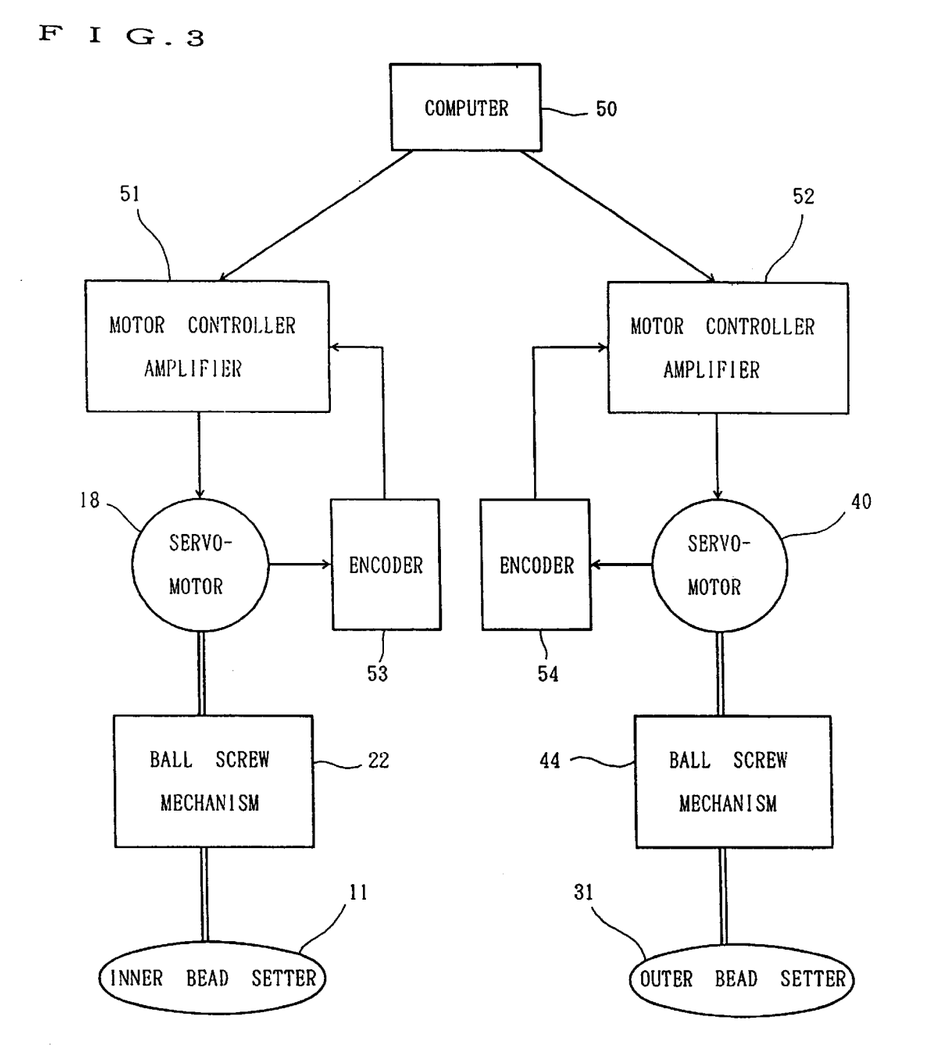
FIG. 3 is a rough block diagram of a drive control system of the bead setter.

The servomotors 18, 40 having capacities of 2.2 Kw and 3.7 Kw respectively are controlled by a computer 50 as shown in FIG. 3 which is a rough block diagram of the control system.

The servomotors 18, 40 are controlled through motor controller amplifiers 51, 52 in accordance with control instructions from the computer 50.

Numbers of revolutions of the servomotors 18, 40 are detected by encoders 53, 54. Since the detected numbers of revolutions correspond to positions of the inner and outer bead setters 11, 31 moved right and left, the encoders 53, 54 detect the positions of the bead setters 11, 31. The detection signals are fed back to the motor controller amplifiers 51, 52.

The computer 50 is stored with optimum control values of control timing, moving speed (rotational speed) and thrust (rotational torque) for every tire size, and outputs control instruction signals based on the control values to the motor controller amplifiers 51, 52.

The motor controller amplifiers 51, 52 control the servomotors 18, 40 in accordance with the control instructions from the computer 50 and the position detection signals from the encoders 53, 54 with a matched timing. By using the motor controller amplifiers 51, 52, rotational speed and torque can be changed arbitrarily in performance of the servomotors 18, 40.

Figure 8:
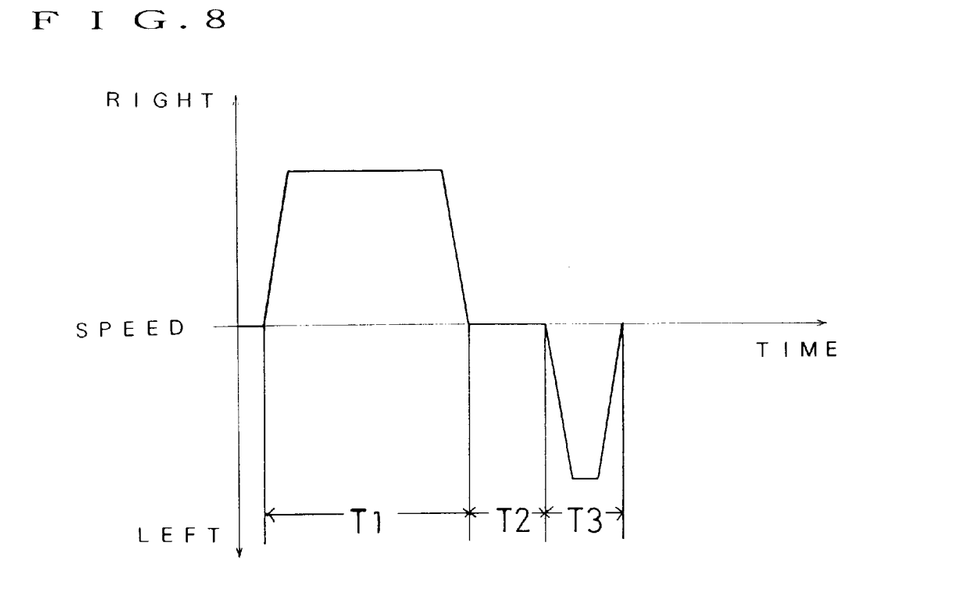
FIG. 8 is a control timing chart in the bead driving step.
Figure 9:
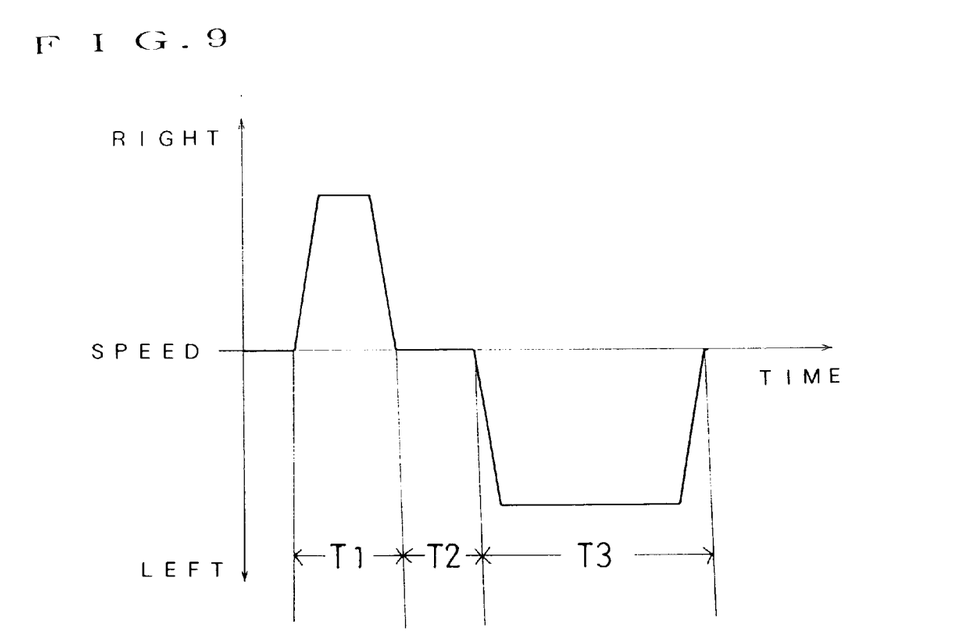
FIG. 9 is a control timing chart in the ply folding back step.

Green tire forming steps by the above-mentioned tire forming machine 1 are shown in FIGS. 4 to 7 in order and timing charts of the speed control are shown in FIGS. 8 and 9.

Figure 4:
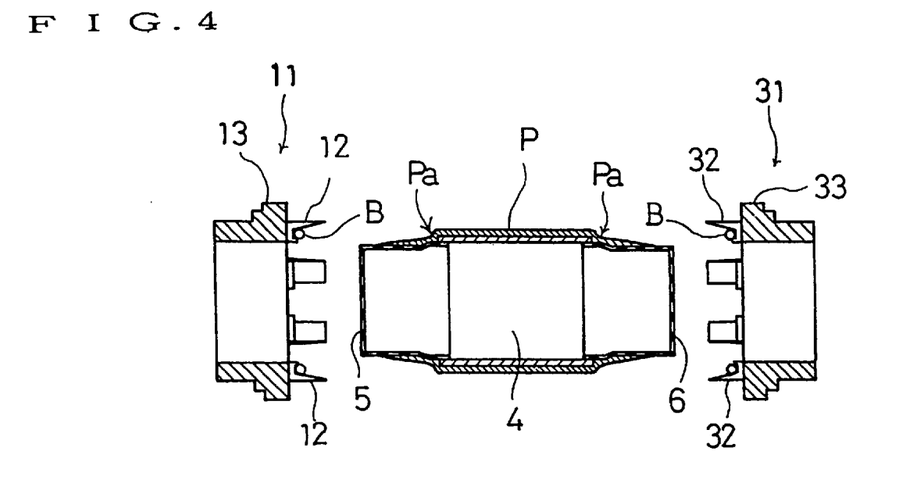
FIG. 4 is a sectional view of an essential part for showing one step of a green tire forming.

At first, as shown in FIG. 4, a ply P is wound round the drum 4, the diameter of the drum is expanded and the inner and outer bead setters 11, 12 having bead holders 12, 32 holding respective annular beads B are positioned at predetermined positions on the both sides.

As the result of the expansion of the drum 4, steps 5a, 6a (FIG. 1) are formed between the drum 4 and the bladders 5, 6 and at the same time similar annular steps Pa, Pa are formed on the wound ply P.

Then the servomotors 18, 40 are operated and the inner and outer bead setters 11, 31 approach the drum 4 to drive the beads.

FIG. 8 is a timing chart of speed control regarding the inner bead setter 11. With regard to the outer bead setter 31 also nearly the same control is carried out.

Figure 5:
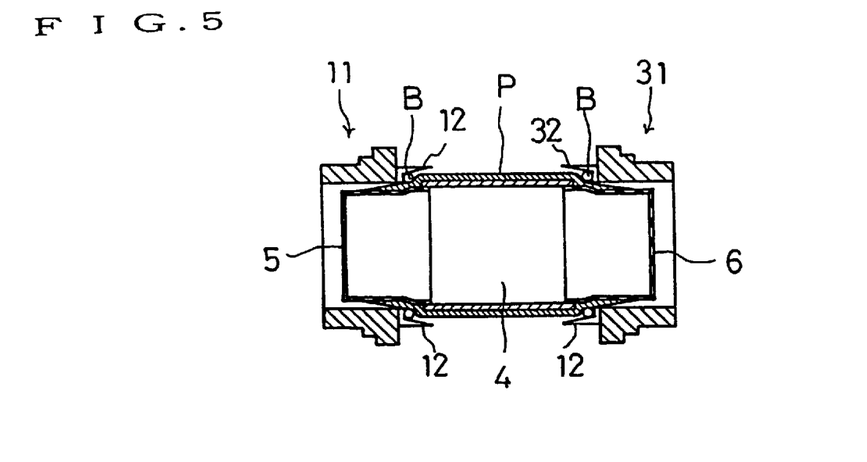
FIG. 5 is a sectional view of the essential part at bead driving.

Immediately after expansion of the drum 4, the servomotors 18, 40 are operated in a speed control mode to move the inner and outer bead setters 11, 31 at a high speed to positions predetermined for every tire sizes (duration T1 of FIG. 8). As shown in FIG. 5, the beads B, B held by the bead holders 12, 32 are driven against the annular steps Pa, Pa formed at the right and left sides of the ply P wound round the drum 4.

Immediately before the beads B, B are driven against the steps Pa, Pa of the ply P, the servomotors 18, 40 are changed over into a torque control mode to press the beads B, B against the steps Pa, Pa of the ply P during a predetermined time (duration T2 of FIG. 8) for bead driving.

Next, the servomotors 18, 40 are changed over into the speed control mode to let the bead holders 12, 32 go back a little at a high speed leaving the beads B, B at the steps Pa, Pa (duration T3 of FIG. 8).

Immediately before the bead holders 12, 32 go back, the bead holders 12, 32 move radially inward a little to reduce the diameter of the concentric circle for releasing the beads B, B.

Figure 6:
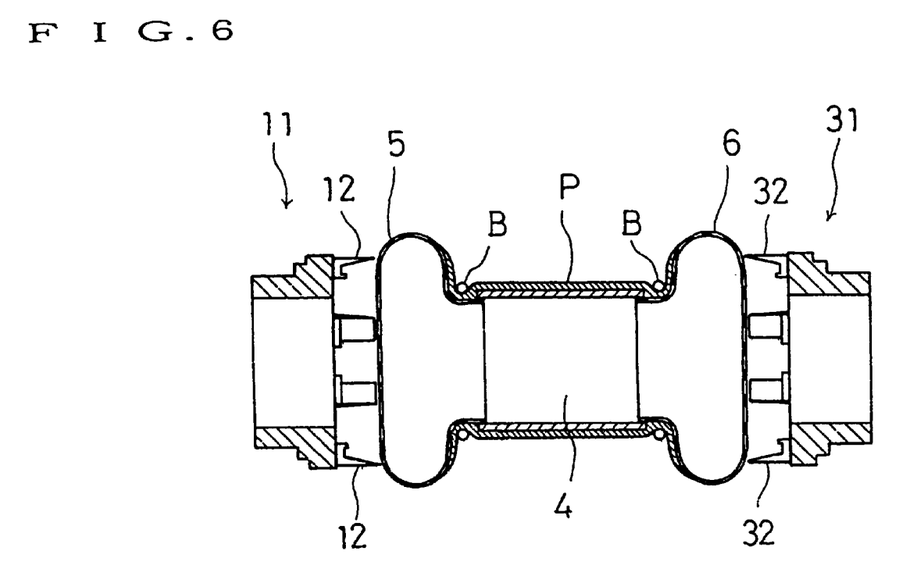
FIG. 6 is a sectional view of the essential part at bladder expanding.
Figure 7:
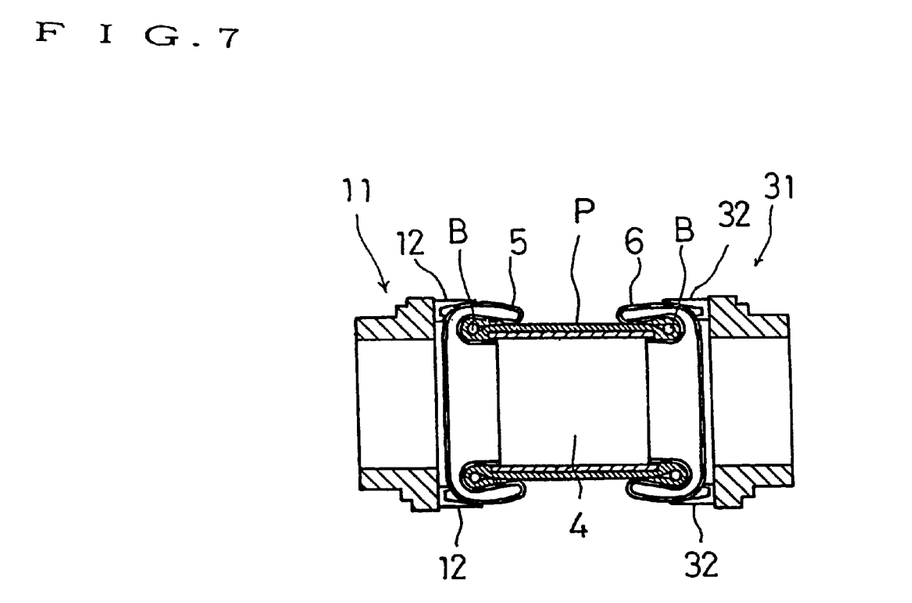
FIG. 7 is a sectional view of the essential part at ply folding back.

After the beads B, B are driven in such a manner, a ply folding back step is started and the bladders 5, 6 are expanded. FIG. 6 is a view showing the expanded bladders in which the right and left sides of the ply P are going to be folded back about the beads B, B.

Next, the servomotors 18, 40 are operated in the speed control mode to move the bead holders 12, 32 somewhat expanded at a high speed to positions predetermined for every tire sizes (duration T1 of FIG. 9).

The bead holders 12, 32 press the expanded bladders 5, 6 sideways to lay down the outer periphery of the bladders 5, 6 onto the peripheral surface of the drum 4 so that the right and left sides of the ply P are folded back so as to wrap the beads B.

Immediately before the bead holders 12, 32 reach positions for folding back the ply, the servomotors 18, 40 are changed over into the torque control mode to press the bladders 5, 6 with a thrust predetermined for every tire size.

Therefore, there is no fear that the bead driven already slips off when the ply is folded back. As the result, quality of the green-case after folding back the ply can be maintained high so that quality of the manufactured tire can be improved.

Since the bead holders 12, 32 press the bladders 5, 6 with the predetermined thrust during a predetermined time (duration T2 of FIG. 9), the right and left sides of the ply P folded back are fixedly pressed on the main part of the ply P by the deformed bladders 5, 6.

Then the servomotors are changed over into the speed control mode and the bead holders 12, 32 go back to the original predetermined positions at a high speed (duration T3 of FIG. 9). Thus a green-case is formed and after that the rotary pedestal 34 turns to direct the case holding apparatus 35 toward the drum 4. The green-case is taken up by the case holding apparatus 35 and transported to a next applying stage.

As mentioned above, when the bead holders 12, 32 are positioned at the bead driving positions and the ply folding back positions, the servomotors 18, 40 are controlled in the torque control mode to press the beads with a predetermined thrust matched with the tire size.

And when the bead holders 12, 32 are positioned at other moving positions, the servomotors 18, 40 are controlled in the speed control mode to move the bead holders at the high sped to shorten the working time and raise the production efficiency.

Since the servomotors 18, 40 are controlled through the controller amplifiers 51, 52, rotational speed and torque can be changed within the performance of the motor and the inner and outer bead setters 11, 12 can be subjected to pertinent position control, speed control and thrust control in accordance with tire sizes.

Owing to the ball screw mechanisms 22, 44 and variable speed mechanisms of the motors, the servomotors 18, 40 have small capacities of 2.2 Kw and 3.7 Kw and electric power consumption is low for enabling to suppress energy consumption.

Since the inner and outer bead setters 11, 31 are driven by means of simple structures which are combinations of the servomotors 18, 40 and ball screw mechanisms 22, 44, the cost is low, the maintenance man-hour is few and the working is easy.

Besides the servomotor, an induction motor subjected to vector control or an electric cylinder with a motor built in may be used.

What is claimed is:

1. A tire manufacturing method for manufacturing on a drum a tire green-case, comprising the steps of:

winding a ply round the drum;

expanding said drum to enlarge its diameter;

positioning annular beds held by an inner bead holder and an outer bead holder at respective predetermined positions on both sides of said drum;

advancing each of said inner and outer bead holders toward said drum at a speed controlled by a control means, then driving said beads in a torque control mode;

switching to a speed control mode and retreating said inner and outer bead holders;

expanding bladders positioned on both sides of said ply;

advancing again each of said inner and outer bead holders toward said drum at a speed controlled by said control means in a speed control mode and then switching to a torque control mode to press said expanded bladder laterally such that both sides of said ply are folded back to wrap said beads; and pressing said both sides of said ply folded back against a main part of said ply.

2. In a tire manufacturing machine for forming a green-case by driving beads on positions near both ends of a ply applied on a drum and folding back the both ends about the beads by means of bladders, the improvement comprising:

bead holders movable in axial direction provided on both sides of said drum for holding said beads to drive them on said portions near both ends of said ply and pressing said bladders expanded to assist in folding back the both ends of said ply;

an electric motor power source;

control means for controlling the drive of said electric motor in both a speed control mode and a torque control mode; and a driving mechanism through which said electric motor moves said bead holder in said speed control mode and applies torque to said bead holder in a torque control mode.

3. A tire manufacturing machine as claimed in claim 2, wherein position detection means for detecting a position of said bead holder is provided, and said control means controls speed and torque of said electric motor on the basis of the position of said bead holder detected by said position detection means.

4. A tire manufacturing machine as claimed in claim 3, wherein said electric motor is a servomotor.

5. A tire manufacturing machine as claimed in claim 3, wherein said electric motor is an induction motor.

6. A tire manufacturing machine as claimed in claim 3, wherein said driving mechanism is a ball screw mechanism connected to said electric motor.

7. A tire manufacturing machine as claimed in claim 2, wherein said electric motor is a servomotor.

8. A tire manufacturing machine as claimed in claim 2, wherein said electric motor is an induction motor.

9. A tire manufacturing machine as claimed in claim 2, wherein said driving mechanism is a ball screw mechanism connected to said electric motor.

\* \* \* \* \*